(12) United States Patent
Papapanos et al.

(10) Patent No.: US 10,422,466 B2
(45) Date of Patent: Sep. 24, 2019

(54) PORTABLE ELECTRONIC DEVICE HOLDER AND RELATED METHOD

(71) Applicants: Kyriakos Papapanos, New Port Richey, FL (US); Jared Salinsky, Trinity, FL (US)

(72) Inventors: Kyriakos Papapanos, New Port Richey, FL (US); Jared Salinsky, Trinity, FL (US)

(73) Assignee: SUC-IT, LLC, Trinity, FL (US)

( * ) Notice: Subject to any disclaimer, the term of this patent is extended or adjusted under 35 U.S.C. 154(b) by 0 days.

(21) Appl. No.: 15/827,688

(22) Filed: Nov. 30, 2017

(65) Prior Publication Data
US 2018/0149302 A1    May 31, 2018

Related U.S. Application Data

(60) Provisional application No. 62/427,946, filed on Nov. 30, 2016.

(51) Int. Cl.
| | |
|---|---|
| *F16M 11/00* | (2006.01) |
| *F16M 11/04* | (2006.01) |
| *B60R 11/02* | (2006.01) |
| *F16M 13/02* | (2006.01) |
| *F16M 13/00* | (2006.01) |
| *H04M 1/04* | (2006.01) |
| *F16B 47/00* | (2006.01) |
| *B60R 11/00* | (2006.01) |

(52) U.S. Cl.
CPC ....... *F16M 11/041* (2013.01); *B60R 11/0241* (2013.01); *B60R 11/0258* (2013.01); *F16M 13/00* (2013.01); *F16M 13/022* (2013.01); *H04M 1/04* (2013.01); *B60R 2011/0005* (2013.01); *B60R 2011/0056* (2013.01); *B60R 2011/0059* (2013.01); *B60R 2011/0071* (2013.01); *B60R 2011/0075* (2013.01); *F16B 47/00* (2013.01)

(58) Field of Classification Search
CPC ....................................................... F16M 13/00
USPC ..................... 248/316.1, 316.8, 205.7, 206.2
See application file for complete search history.

(56) References Cited

U.S. PATENT DOCUMENTS

| | | | |
|---|---|---|---|
| 5,568,549 A | 10/1996 | Wang | |
| 6,665,524 B1 * | 12/2003 | Niemann | H04B 1/3888 248/309.1 |
| 7,210,662 B2 | 5/2007 | Liou et al. | |
| 7,712,720 B1 * | 5/2010 | Cheng | B60R 11/00 248/205.5 |
| 8,087,625 B2 * | 1/2012 | Chang | F16B 47/00 248/205.5 |

(Continued)

*Primary Examiner* — Steven M Marsh
(74) *Attorney, Agent, or Firm* — Panitch Schwarze Belisario & Nadel LLP

(57) ABSTRACT

A portable electronic device holder for holding and supporting a portable electronic device includes a holding assembly with a holding mechanism and an insert. The holding mechanism having a rear surface and a concave portion extending therefrom with a tab disposed distally from the rear surface. The holding mechanism is configured to selectively connect to a mounting surface. The holder further includes a band and retainer attached to the holding assembly. The band configured to receive at least one hook extending generally rearward from the band to engage the portable electronic device or its cover.

19 Claims, 10 Drawing Sheets

(56) References Cited

U.S. PATENT DOCUMENTS

| | | | |
|---|---|---|---|
| 8,520,838 B1 | 8/2013 | Madden | |
| 8,622,359 B2 | 1/2014 | Carnevali | |
| 8,622,447 B1 | 1/2014 | Wirtz | |
| 8,967,561 B2 | 3/2015 | Cheng et al. | |
| 9,416,814 B2 | 8/2016 | Yeo | |
| 9,581,291 B2 * | 2/2017 | Trotsky | F16M 11/041 |
| 9,936,823 B2 * | 4/2018 | Galant | F16M 11/041 |
| D825,546 S * | 8/2018 | Fan | D14/253 |
| 2011/0024587 A1 * | 2/2011 | Tsai | A47K 10/10 248/206.2 |
| 2012/0049019 A1 | 3/2012 | Chen | |
| 2012/0292467 A1 * | 11/2012 | Chen | A45D 27/225 248/206.2 |
| 2013/0148273 A1 * | 6/2013 | Tsai | F16M 11/041 361/679.01 |
| 2013/0293964 A1 * | 11/2013 | Marr | G02B 7/182 359/618 |
| 2015/0184799 A1 | 7/2015 | Whitney | |

* cited by examiner

PORTABLE ELECTRONIC DEVICE HOLDER AND RELATED METHOD

CROSS-REFERENCE TO RELATED APPLICATIONS

This application claims priority from U.S. Provisional Patent Application No. 62/427,946, titled "Portable Electronic Device Holder and Related Method," filed on Nov. 30, 2016, the contents of which are incorporated by reference in its entirety herein.

BACKGROUND OF THE INVENTION

Being in an era of technology, portable electronic devices, such as cell phones, tablets, Personal Digital Assistants (PDAs), cameras, gaming devices, personal navigation devices, audio players, multimedia players and the like are ubiquitous in daily life. Whether the portable electronic devices are being used for taking pictures, surfing the web, connecting to global positioning systems ("GPS") for navigation, watching movies or other reasons, use of portable electronic devices is prevalent and increasing. Such use, however, often requires a user to occupy both hands, one hand to hold or handle the device and the other hand to manipulate the device by swiping the screen, pressing buttons, or the like. Accordingly, there is a need for a device to simplify usage of the portable electronic devices for the ease and convenience of the user, particularly by developing a device that is capable of holding the portable electronic device in a convenient location on nearly any surface for viewing and usage by the user. The preferred invention provides a device to meet the identified needs and overcome shortcomings in existing devices.

BRIEF SUMMARY OF THE INVENTION

Briefly stated, a preferred embodiment of the present invention is directed to a portable electronic device holder for holding and supporting a portable electronic device includes a holding assembly with a holding mechanism and an insert. The holding mechanism having a rear surface and a concave portion extending therefrom with a tab disposed distally from the rear surface. The holding mechanism is configured to selectively connect to a mounting surface. The holder further includes a band and retainer attached to the holding assembly. The band configured to receive at least one hook extending generally rearward from the band to engage the portable electronic device or its cover.

In another aspect, the preferred invention is directed to a portable electronic device holder for holding and supporting a portable electronic device having a rear device surface. The portable electronic device holder includes a resilient base having a rear surface and a front surface. The front surface is disposed opposite the rear surface and the rear surface is generally planar. A holding mechanism is connected to and extends from the front surface. A connection mechanism extends from the resilient base. The connection mechanism has a first portion extending away from a first side of the base and a second portion extending away from a second opposite side of the base. The first and second portions extend generally parallel to the rear surface away from the base. The first and second portions include first and second hook portions on distal ends, respectively. The first and second hook portions are configured to engage and secure the portable electronic device to the portable electronic device holder in a mounted configuration. The rear surface of the base is positioned in facing engagement or adjacent to the rear device surface in the mounted configuration.

In yet another aspect the preferred invention is directed to a portable electronic device holder for holding and supporting a portable electronic device. The portable electronic device holder includes a holding assembly having a holding mechanism with a rear surface and a concave front portion. The holding assembly further includes an insert attached to and extending from the rear surface of the holding mechanism. The insert includes a foot and a shaft with a ring trench spaced from the rear surface in an assembled configuration. A band is attached to the shaft of the insert. The band includes a central portion having a central hole and two opposing arms extending away from the central portion. The opposing arms include a first arm and a second arm. A first slit is positioned proximate a distal end of the first arm and a second slit is positioned proximate a distal end of the second arm. A retainer has a circular portion and a ring wall disposed on the perimeter of the circular portion. The retainer further has a groove extending radially outward from the center of the circular portion. The groove is dimensioned to engage the ring trench of the insert of the holding assembly in the assembled configuration. A first hook is removably mounted to the first slit in the assembled configuration. A second hook is removably mounted to the second slit in the assembled configuration. The first and second hooks include first and second band engaging portions, respectively. The first and second hooks further include first and second electronic device engaging portions, respectively. The first and second electronic device engaging portions including first and second nubs, respectively, to assist in retaining the portable electronic device to the holder in a mounted configuration.

BRIEF DESCRIPTION OF THE SEVERAL VIEWS OF THE DRAWINGS

The foregoing summary, as well as the following detailed description of preferred embodiments of the device and method of the present application, will be better understood when read in conjunction with the appended drawings. For the purpose of illustrating the invention, there is shown in the drawings, embodiments, which are presently preferred. It should be understood, however, that the application is not limited to the precise arrangements and instrumentalities shown. In the drawings.

DETAILED DESCRIPTION OF THE INVENTION

Figure 2:
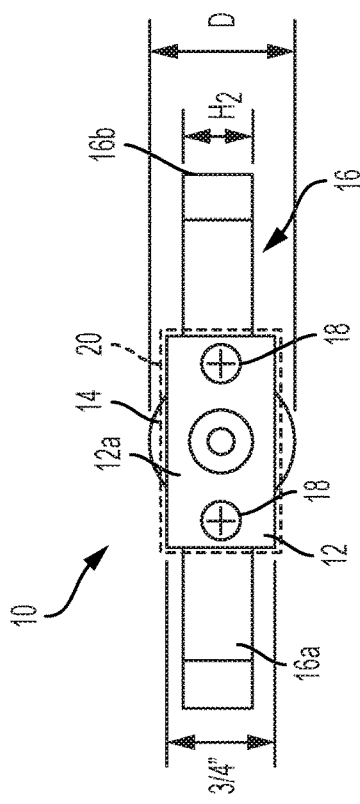
FIG. 2 is a rear elevational view of the portable electronic device holder of FIG. 1.
Figure 3:
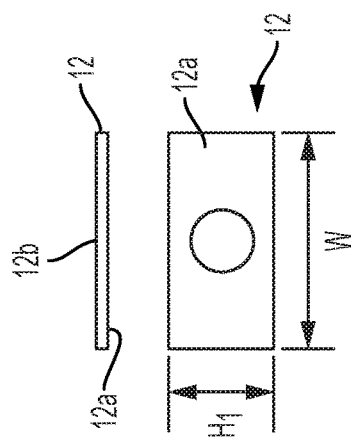
FIG. 3 is a top plan view and a rear elevational view of a resilient base of the portable electronic device holder of FIG. 1.
Figure 1:
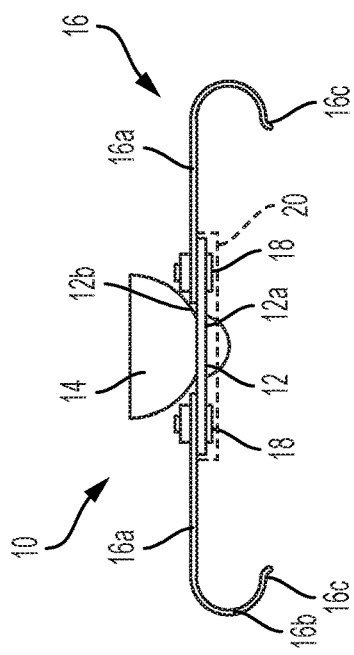
FIG. 1 is a top plan view of a portable electronic device holder in accordance with a first preferred embodiment of the present invention.
Figure 4:
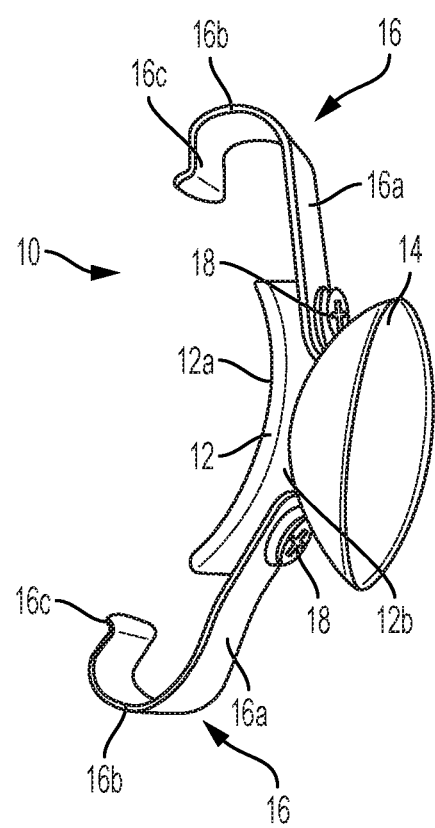
FIG. 4 is a front perspective view of the portable electronic device holder of FIG. 1.

Certain terminology is used in the following description for convenience only and is not limiting. Unless specifically set forth herein, the terms "a", "an" and "the" are not limited to one element but instead should be read as meaning "at least one". The words "right", "left", "lower" and "upper" designate directions in the drawings to which reference is made. The words "inwardly" or "distally" and "outwardly" or "proximally" refer to directions toward and away from, respectively, the geometric center of the preferred portable electronic device holder and related parts thereof. The terminology includes the above-listed words, derivatives thereof and words of similar import.

It should also be understood that the terms "about," "approximately," "generally," "substantially" and like terms, used herein when referring to a dimension or characteristic of a component of the preferred invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-5, a first preferred embodiment of the present invention is directed to a portable electronic device holder, generally designated 10 and may be referred to herein as the "holder," for holding and supporting a portable electronic device 11 having a rear device surface 11a. The portable electronic device 11 may be positioned within a cover 11a that may also be supported and held by the holder 10. The holder 10 includes a resilient base 12 having a generally planar rear surface 12a and a front surface 12b, the front surface 12b being disposed opposite the rear surface 12a. The resilient base 12 is preferably constructed of a polymeric material, and most preferably of a rubber material. The preferred polymeric or rubber material of the base 12 is able to provide limited flexibility and stretch for manipulating the portable electronic device holder 10 and engaging the portable electronic device 11, as will be described in greater detail below.

The preferred holder 10 includes a holding mechanism 14 connected to and extending from the front surface 12b of the base 12. The holding mechanism 14 is configured to selectively connect to a mounting surface (not shown), such as a table, desk, dashboard, wall, window, seat or nearly any surface with which it is desirable for a user to engage or mount the portable electronic device holder 10 and portable electronic device 11. The holding mechanism 14 is preferably configured such that the operator is able to operate the device 11 without holding the device 11 in their hand, as will be described in greater detail below. In the preferred embodiment, the holding mechanism 14 is comprised of a suction cup 14 that facilitates mounting to nearly any surface, such as a wall, mirror, countertop, window or other related surfaces. The holding mechanism 14 is not limited to being comprised of the suction cup 14 and may be comprised of nearly any mechanism or device that is able to releasably secure the portable electronic device holder 10 to a surface or object for use of the portable electronic device 11. For example, the holding mechanism 14 may be comprised of an adhesive, a clamp, a fastener, or other mechanism or method that selectively secures the portable device holder 10 to a surface or other generally rigid structure.

The first preferred holder 10 also includes at least one, and preferably two opposing, connection mechanism 16 extending from sides of the base 12. Each of the connection mechanisms 16 has a first portion 16a extending away from the base generally parallel to the planar rear surface 12a. The connection mechanisms 16 also include a second hook portion 16b extending away from the first portion 16a and extending generally away from the planar rear surface 12a. The connection mechanisms 16 further include an engagement portion 16c disposed on an end of the second hook portion 16b opposite the first portion 16a. In a mounted configuration, the first portions 16a are positioned in facing engagement with or adjacent a rear surface of the portable electronic device 11 or a cover 11a of the portable electronic device 11, the second hook portions 16b are engaged with sides of the portable electronic device 11 or the cover 11a of the portable electronic device 11 and the engagement portions 16c are engaged with a front surface of the portable electronic device 11 to secure the portable electronic device holder 10 to the portable electronic device 11. The connection mechanisms 16 are fixed to the base 12 at ends of the first portions 16a by fasteners 18, but are not so limited. The fasteners 18 of the connection mechanisms 16 may be screws, bolts, clamps, adhesives or any other suitable fastener well known in the art. In the preferred embodiment, the fasteners 18 are Phillips headed screws, but are not so limited. In an alternative embodiment, the connection mechanisms 16 may be integrally formed with the base 12. Additionally, the connection mechanisms 16 are preferably constructed of a metallic material, but may be constructed of a polymeric, wooden, composite or any other suitable structural material that is able to take on the general size and shape of the connection mechanisms 16 and withstand the normal operating conditions of the connection mechanisms 16. In addition, the connection mechanisms 16 may be selectively mountable to the base 12, instead of being fixed to the base 12.

The preferred holder 10 also includes a cover 20 attached to the rear surface 12a. The cover 20 is preferably constructed and configured to limit exposure of the fasteners 18 and potentially other edges of the holder 10 from contacting and potentially scratching or damaging the portable electronic device 11. The cover 20 is preferably adhesively bonded, shrink wrapped, clamped or otherwise secured to the rear surface 12a to generally cover the base 12 and directly contact the portable electronic device 11 or the portable electronic device cover 11a in the mounted configuration. The cover 20 is preferably constructed of a polymeric material, most preferably of a rubber material, but may be elastomeric, composite, or any suitable material that is able to take on the general size and shape of the cover 20, withstand the normal operation conditions of the cover 20 perform the preferred functions of the cover 20, as is generally described herein.

In the first preferred embodiment, the suction cup or holding mechanism 14 has a diameter D of approximately one inch (1"), the resilient base 12 has a height $H_1$ of approximately three-quarters of an inch (¾"), the resilient base has a width W of approximately one and one-half inches (1½") and the first and second hook portions 16a, 16b have a height $H_2$ of approximately one-half inch (½"). The resilient base 12, first and second hook portions 16a, 16b and the suction cup 14 are not limited to having these particular dimensions, but these dimensions are currently preferred for the first preferred device holder 10 for holding a typical portable electronic device 11.

In operation, the portable electronic device holder 10 is selectively mountable to the portable electronic device 11 or the portable electronic device cover 11a in a mounted configuration. The holder 10 may be secured to the portable electronic device 11 by wrapping one of the second hook portions 16b of the connection mechanisms 16 around a side of the portable electronic device 11 and positioning the rear surface 12a or the cover 20 against a rear surface of the portable electronic device 11 or its portable electronic device cover 11a. In the preferred embodiment, an opposing second hook portion 16b is then pulled to engage the opposite side of the portable electronic device 11. The base 12 preferably stretches when pulled to permit the user to engage the opposing second hook portion 16b with the opposite side of the portable electronic device 11. The rubber or otherwise flexible material of the base 12 facilitates this stretching of the holder 10 and also provides a clamping force to draw the opposing second hook portions 16b and engagement portions 16c to the opposing sides of the portable electronic device 11 to secure the holder 10 to the portable electronic device 11. This preferred design and configuration of the portable electronic device holder 10 facilitates relatively simple and easy engagement and disengagement of the holder 10 from the portable electronic device 11, such as a mobile phone, smartphone or tablet. The portable electronic device holder 10 is also adaptable for engagement with the portable electronic device 11 when the cover is secured to the portable electronic device 11. The resilient base 12 is particularly adapted for mounting the holder 10 to variously sized mobile phones, smartphones and tablets 11, with or without covers 11a, by flexing and stretching to accommodate the different sizes of the mobile phones, smartphones and tablets 11, with or without covers 11a.

In the first preferred embodiment, the holding mechanism 14 provides a relatively strong hold to a glossy or flat surface. The holding mechanism 14 is also configured to provide suction or removable engagement to curved, uneven or relatively rough surfaces. The holding mechanism 14 may also be designed and configured to hold the portable electronic device 11 at an angle to an attachment surface or to act as a kick stand for angling the portable electronic device 11 for viewing by the user, such as for watching videos for an extended period of time on the portable electronic device 11. The holding mechanism 14 may also be utilized to mount the portable electronic device 11 and its cover 11a to a structure or surface, such as a wall or post, for taking photographs of the user or in a group setting. The holding mechanism 14 may further be used to secure the portable electronic device 11 to a car dashboard to utilize the portable electronic device 11 as a GPS for directions or to provide entertainment to the driver and passengers during an extended ride. The holding mechanism 14 can further be utilized to hold and position the portable electronic device 11 in position while browsing or texting with the device 11. In addition, the holding mechanism 14 may be utilized to secure the portable electronic device 11 to a table or counter to make sure the portable electronic device 11 does not get knocked off and potentially damaged. The preferred holder 10 is designed configured to be relatively light, durable and low-profile. The preferred holder 10 may be utilized when the user is playing golf, fishing, basketball or any other activity for attaching the portable electronic device 11 to a surface and record the user for later viewing.

The preferred holder 10 is small and compact. The holder 10 of the preferred embodiment can be placed on your portable electronic device 11 and its cover 11a, such as a cell phone, smartphone or tablet and can be used for engagement with many different surfaces. For example, the user may be out with friends and desires taking a photograph of the group. The holder 10 can be mounted to a surface and the timer used for a picture. Some users carry selfie-sticks for taking pictures to provide greater distancing of the portable electronic device 11 away from the user than arms-length and even these selfie-sticks typically cannot accommodate photographs or provide a sufficient distance for certain group or family photographs and are relatively bulky and awkward to transport. The preferred holder 10 provides an opportunity to capture these moments by providing a nearly unlimited distancing or spacing of the portable electronic device 11 from the group. Additionally, there is preferably no longer a need for large bully GPS holders for cars, because the portable electronic device holder 10 already is on the cell phone or other device or in a pocket and ready to use. The preferred holder 10 is a unique and simple holder for a portable electronic device 11, such as a cellphone, that will allow users to use the portable electronic device 10 however desired.

Referring to FIGS. 6-12, a second preferred embodiment of the present invention is directed to a portable electronic device holder, generally designated 100 and generally referred herein as the "holder." The second preferred holder 100 includes a holding mechanism 102, preferably comprised of a suction cup, having a convex rear surface 104 and a concave front surface 106. The holding mechanism 102 further includes a tab 108 disposed on the convex rear surface 104. The holding mechanism or suction cup 102 is preferably constructed of an elastomer, polymer, silicone, or any other suitable material that is able to take on the general size and shape of the holding mechanism 102 and withstand the normal operating conditions of the holding mechanism 102. The holding mechanism 102 of the second preferred embodiment is constructed of a silicone material. The holding mechanism 102 of the second preferred embodiment further includes an insert 110 having a generally cylindrical shaft 112 and at least one foot 114. The insert 110 includes a ring trench 116 disposed on the shaft 112 and circumscribing the shaft 112, which is spaced from the foot 114. The insert 110 is preferably constructed of a generally stiff, strong elastomeric material, most preferably nylon, and is configured to be overmolded by the suction cup 102 to form a holding assembly 118 with a retainer 130. In a mounted configuration, the holding mechanism 102 is connected to and extends from the front surface 120b and also includes that insert 110 mounted thereto that extends through the base or band 120. The holding assembly 118 or connection mechanism 118 extends from the resilient base or band 120 in the mounted configuration with a first portion, including the suction cup 102, extending from front surface 120b and a second portion, including a portion of the insert 110, extending from the rear surface 120a.

Figure 12:
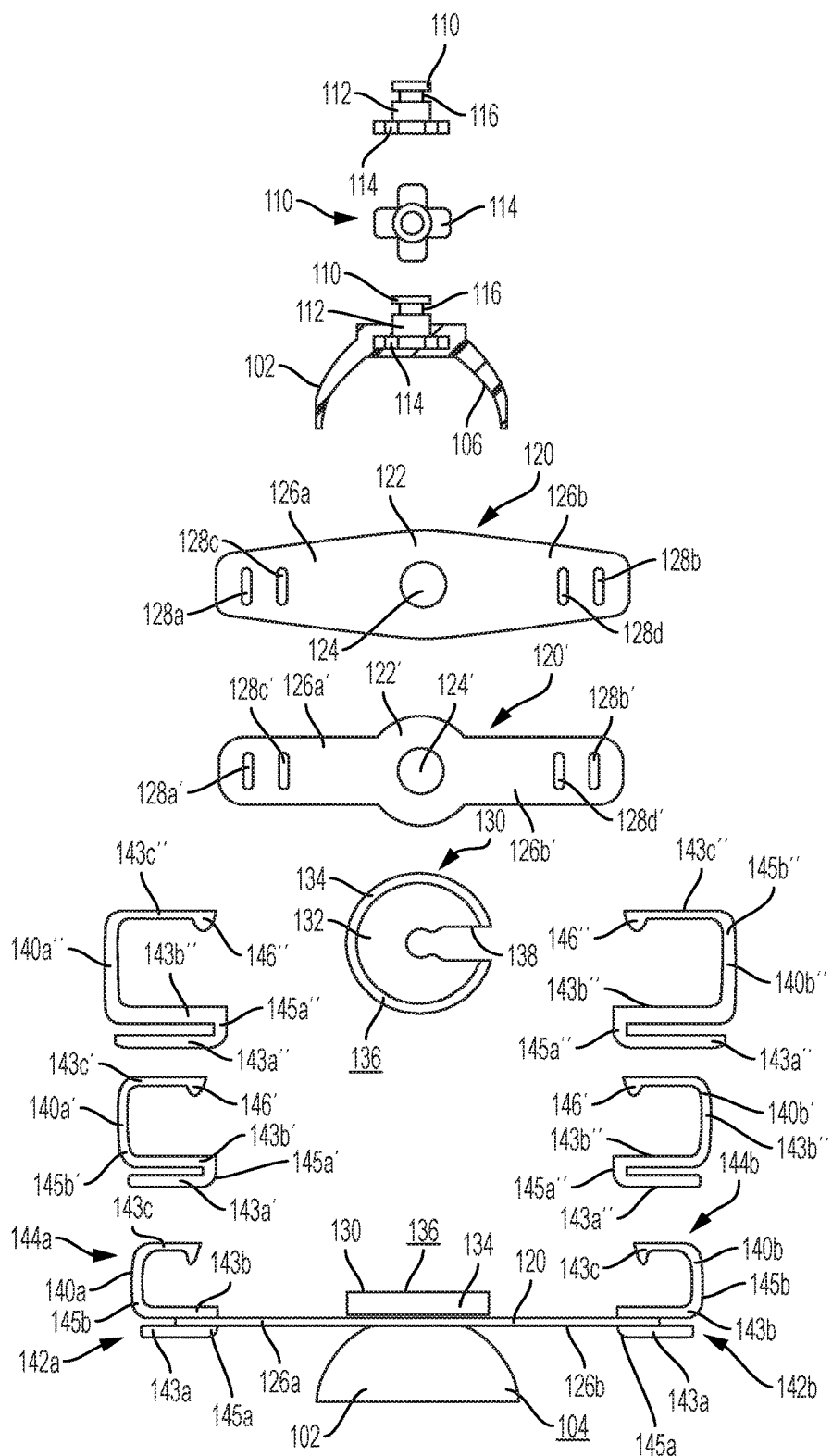
FIG. 12 is a set of various views of components of the portable electronic device holder of FIG. 6.

The holder 100 of the second preferred embodiment also includes a band or resilient base 120 that is mountable to the shaft 112 of the insert 110 of the holding assembly 118. The band or base 120 includes a central portion 122 having a central hole 124, which is configured to releasably engage the shaft 112. The band 120 further includes two diametrically opposed arms 126, including a first arm 126a and a second arm 126b, extending away from the central portion 122. The base or band 120 also includes a rear surface 120a and a front surface 120b with the front surface 120b being disposed opposite the rear surface 120a. The rear surface 120a is generally planar. In the second preferred embodiment, the arms 126 may gradually taper from the central portion 122 as the arms 126 extend outwards therefrom to their distal ends (see FIG. 12). In an alternative second preferred embodiment of the band or base 120', which is shown in FIG. 12 and utilizes the same reference numbers to show similar features of the alternative second preferred embodiment but with a prime symbol ("'") to distinguish the alternative second preferred band or base 120' from the second preferred band or base 120, the arms 126' may have a constant width throughout which is less than the width of the central portion 122' (see FIG. 12). The arms 126 of the second preferred embodiment each include at least one transverse slit 128, including a first slit 128a in the first arm 126a and a second slit 128b in the second arm 126b. The slits 128 preferably extend entirely through the band 120 in a direction orthogonal to the direction that the arms 126 extend away from the central portion 122 or generally through the arms 126 near their distal ends. The band or base 120 is preferably constructed of an elastomeric, rubber or polymeric material, but may be made of any suitable material that is able to take on the general size and shape of the band or base 120, withstand the normal operating conditions of the band or base 120 and perform the preferred functions of the band or base 120. In the preferred embodiment, the band or base 120 also includes a third slit 128c in the first arm 126a and a fourth slit 128d in the second arm 126b. The third and fourth slits 128c, 128d are preferably spaced inwardly from the first and second slits 128a, 128b, respectively, toward the central hole 124. The band or base 120 may also include additional slits (not shown) that may be utilized to adjust the holder 100 to various sized portable electronic devices 11 or portable electronic device cases 11a.

The holder 100 of the second preferred embodiment further includes a retainer 130 that is part of the holding assembly 118. The retainer 130 is configured to engage the insert 110 and secure the band 120 to the holding assembly 118. The retainer 130 preferably includes a generally planar circular portion 132 and a ring wall 134 disposed on the perimeter of the circular portion 132. The ring wall 134 preferably extends rearward from the circular portion 132. The ring wall 134 includes an engagement surface 136 which is configured to engage a rear surface of the portable electronic device 11 or the associated cover 11a. The retainer 130 further includes a groove 138 extending radially outward from the center of the circular portion 132. The groove 138 is dimensioned to be at least slightly less than the diameter of the ring trench 116 of the insert 110, particularly near the center of the retainer 130 wherein the groove 138 narrows at the middle of the retainer 130. The ring trench 116 is configured to be slidably inserted into the groove 138 in the assembled configuration. The ring trench 116 receives a portion of the retainer 130 in the assembled configuration to secure the holding assembly 118 to the base or band 120. The retainer 130 is preferably constructed from an elastomer, polymer, nylon, or any other like material that is able to take on the general size and shape of the retainer 130, withstand the normal operating conditions of the retainer 130 and perform the functions of the retainer 130, as described herein. The retainer 130 is preferably constructed of a generally strong, structural, stiff polymeric material that is able to secure the holding assembly 118 to the band or base 120 in the mounted configuration. In the mounted configuration, the rear surface 120a of the resilient base or band 120 is positioned in facing engagement or adjacent to the rear device surface 11a such that the portable electronic device 11 is minimally spaced from the surface to which the holding mechanism 102 is attached. The relatively minimal spacing between the surface that the holder 100 is mounted to and the portable electronic device 11 minimizes the load that must be carried or forces that must be reacted to secure the portable electronic device 11 to the surface, as opposed to the portable electronic device being spaced from the surface, which results in greater forces for reaction by the holding mechanism 102. In the second preferred embodiment, the holding mechanism 118 includes the insert 110, the suction cup 102 and the retainer 130, wherein the insert and the retainer 130 are constructed of a rigid polymeric material and the suction cup 102 is constructed of an elastic polymeric material.

The holder 100 includes a connection mechanism 140 including a first hook 140a and a second hook 140b in the second preferred embodiment. The connection mechanism 140 is configured to engage edges or sides of the portable electronic device 11 to secure the portable electronic device 11 to the holder 100 in the mounted configuration. The first and second preferred hooks 140a, 140b are configured to be removably mounted to the slits 128 of the band 120, preferably with the first hook 140a engaging the first slit 128a in the band or base 120 and the second hook 140b engaging the second slit 128b in the band or base 120. The first and second hooks 140a, 140b may alternatively be mounted to the third and fourth hooks 128c, 128d, respectively, or in nearly any combination to engage variously sized portable electronic devices 11, as will be described in greater detail herein. In the second preferred embodiment, the opposing hooks 140, including the first and second hooks 140a, 140b, are constructed of a polymeric material, wherein the polymeric material is preferably polyoxymethylene.

The hooks 140 of the second preferred embodiment each include a band engaging portion 142 and an electronic device engaging portion 144 integrally formed therewith. The hooks 140, preferably each include a lower lateral section 143a, a middle lateral section 143b and a top lateral section 143c that are connected by a first vertical section 145a and a second vertical section 145b. The band engaging portion 142 is preferably comprised of the lower lateral section 143a, the middle lateral section 143b and the first vertical section 145a. The first hook 140a includes a first band engaging portion 142a and the second hook 140b includes a second band engaging portion 142b. The electronic device engaging portion 144 is preferably comprised of the middle lateral section 143b, the top lateral section 143c and the second vertical section 145b. The first hook 140a includes a first electronic device engaging portion 144a and the second hook 140b includes a second electronic device engaging portion 144b. The lower and middle lateral sections 143a, 143b are preferably positioned closer to each other than the middle and top lateral section 143b, 143c, such that the second vertical section 145b is longer than the first vertical section 145a. The space between the lower and middle lateral sections 143a, 143b preferably receives a portion of the band 120 therein in the mounted position with the first vertical section 145a positioned in one of the slits 128a, 128b, 128c, 128d. The distance between the middle lateral section 143b and the top lateral section 143c is preferably sized such that the portable electronic device 11 is positionable between the middle and top lateral sections 143b, 143c. The band engaging portion 142 and the electronic device engaging section 144 are preferably configured to have generally U-shapes for engaging the band 120 and the portable electronic device 11, respectively. Each of the lower, middle and top lateral sections 143a, 143b, 143c and the first and second vertical sections 145a, 145b are generally planar and are somewhat flexible to accommodate grasping the portable electronic device 11 and selectively mounting to the band 120, respectively.

The top lateral section 143c preferably includes a nub 146 extending laterally inwardly from the top lateral section 143c toward the middle lateral section 143b and preferably positioned at a distal end of the top lateral section 143c. The nub 146 is configured to assist in retaining the portable electronic device 11 in the mounted configuration. In the mounted configuration, the base or band 120 is preferably force fit or friction fit into the space between the lower and middle lateral sections 143a, 143b to assist in securing the hook 140 to the band 120 at the selected slit 128a, 128b, 128c, 128d. The hook 140 may be selectively mounted and removed from the slits 128a, 128b, 128c, 128d to accommodate different sized portable electronic devices 11 utilizing the same base or band 120 and hooks 140.

In the second preferred embodiment, several pairs of first and second hooks 140a', 140b', 140a", 140b" of different sizes are provided to facilitate use of the holder 100 with different size portable electronic devices 11. Two alternative embodiments of the first and second hooks 140a', 140b', 140a", 140b" having different sizes than the first and second hooks 140a, 140b are shown in FIG. 12 with a first alternative preferred first and second hooks 140a', 140b' identified with a prime symbol ("'") and a second alternative preferred first and second hooks 140a", 140b" identified with a double-prime symbol ("''"), wherein like numerals are used to identify like features of the alternative first and second hooks 140a', 140b', 140a", 140b". Like numerals are utilized to identify like features of the preferred hooks 140 with respect to the first and second alternative preferred hooks 140', 140" with the prime ("'") and double-prime symbols ("''") distinguishing the first and second alternative preferred embodiments, respectively, with the differences between the embodiments being substantially related to the size of the portable electronic device engaging portions 144. The alternative first and second hooks 140a', 140b', 140a", 140b" are preferably constructed of a polymeric material, most preferably a polyoxymethylene material.

The hooks 140 are preferably constructed of a polymeric or elastomeric material, but may be any other suitable material that is able to take on the general size and shape of the hooks 140, withstand the normal operating conditions of the hooks 140 and perform the typical functions of the hooks 140, as is described herein. The preferred polymeric or elastomeric material of the hooks 140 is able to provide limited flexibility and stretch for manipulating the portable electronic device holder 100 and engaging the portable electronic device 11, as is described herein.

The holding mechanism 102 and insert 110 of the holding assembly 118 are preferably assembled by positioning the insert 110 into a mold for forming the holding mechanism 102 and injection molding polymeric material into the mold, which forms and cures around the insert 110. The feet 114 of the insert 110 integrate with and provide mechanical connection to the holding mechanism 102 material that cures around the insert 110. Accordingly, the insert 110 is co-molded or integrally molded into the holding mechanism 102, but is not so limited. The insert 110 and holding mechanism 102 may be molded at the same time with the same material, may be otherwise mechanically attached or the holding mechanism 102 may be otherwise configured to include a different mechanism for attaching to the base or band 120. The insert 110, however, is preferably constructed of a different polymeric material than the holding mechanism 102, with the material of the insert 110 being stiffer and stronger than the material of the holding mechanism 102. The holding mechanism 102 is specifically constructed of a relatively elastic, resilient material that is able to perform the suction cup functions of the holding mechanism 102, while the insert 110 is preferably stiffer and stronger to engage with the retainer 130 for securing the holding assembly 118 to the base or band 120.

In operation, the portable electronic device holder 100 is assembled and is selectively mountable to the portable electronic device 11 in a mounted configuration. The hooks 140 having the appropriate size are selected and mounted to the base or band 120. For example, the first and second hooks 140a, 140b of the second preferred embodiment may be mounted to the first and second slits 128a, 128b by engaging the first and second band engaging portions 142a, 142b with the first and second slits 128a, 128b by inserting the lower lateral sections 143a of the first and second band engaging portions 142a, 142b through the first and second slits 128a, 128b and force fitting the adjacent portions of the base or band 120 between the lower and middle lateral sections 143a, 143b, respectively. The first and second hooks 140 may alternatively be positioned in any combination of the slits 128a, 128b, 128c, 128d on opposing sides of the central hole 124 to accommodate variously sized portable electronic devices 11. In addition, the alternative embodiments of the first and second hooks 140a', 140b', 140a", 140b" may be selected for mounting to the band or base 120 to accommodate portable electronic devices 11 having different thicknesses. The combination of components of the holder 100 may be packaged together and sold in a kit to a user such that the user may assemble and accommodate different sized portable electronic devices 11. The preferred kit for the holder 100 may include, for example, the holding assembly 118, the preferred and alternative preferred base or band 120, 120' and the preferred and alternatively preferred pairs of hooks 140, 140', 140". These components of the preferred holder 100 may be sized and configured to accommodate variously sized portable electronic devices 11, preferably the most common portable electronic devices 11, such as mobile phones, tablets, smartphones and these portable electronic devices 11 with associated covers or protectors thereon.

Once the holding assembly 118 is mounted to the base 120, 120' and the pairs of hooks 140, The holder 100 may be secured to the portable electronic device 11 by wrapping one of the hooks 140, 140', 140" are engaged in the appropriate slits 128a, 128b, 128c, 128c, the opposing hooks 140, 140', 140" are positioned around a side of the portable electronic device 11. The thickness of the portable electronic device 11 is preferably positioned in the opposing portable device engaging portions 144a, 144b between the middle and top lateral sections 143b, 143c with the second vertical section 145b positioned against and applying a compression force against the side of the portable electronic device 11 or the associated portable electronic device cover. The resilient or elastic band or base 120 applies the biasing or compression force against the sides of the portable electronic device 11 to at least partially retain the holder 100 onto the portable electronic device 11. In this mounted configuration (e.g.

Figure 5:
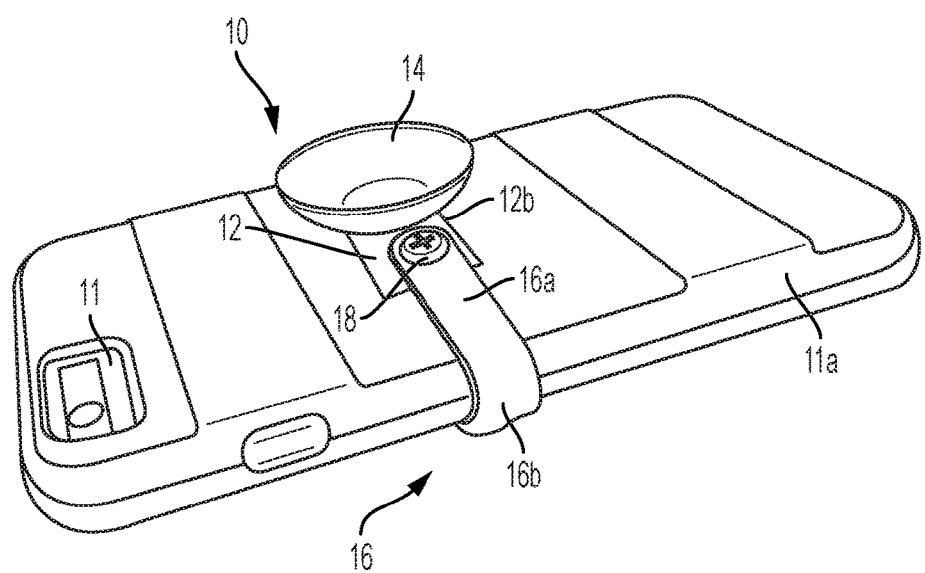
FIG. 5 is a right side perspective view of the portable electronic device holder of FIG. 1, wherein the holder is mounted to a portable electronic device.
Figure 6:
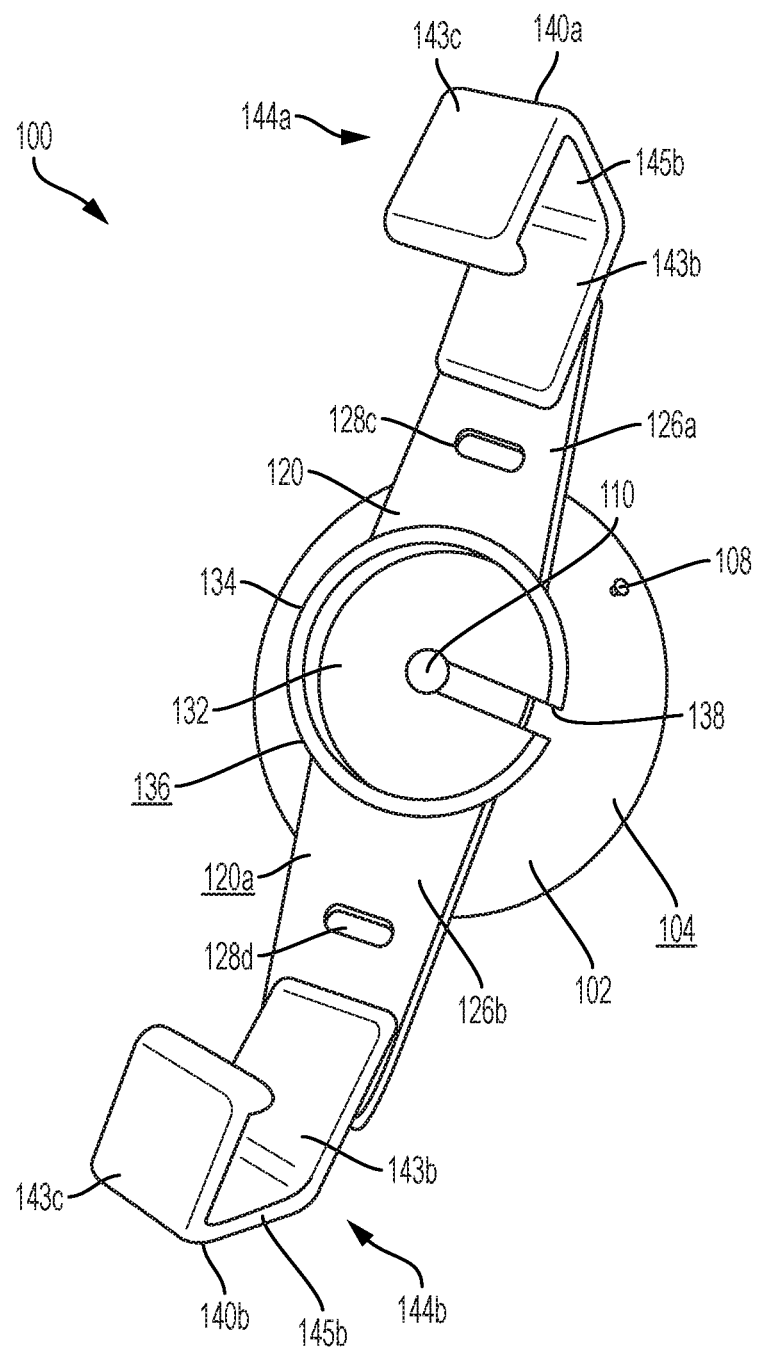
FIG. 6 is a rear perspective view of a portable electronic device holder in accordance with a second preferred embodiment of the present invention.
Figure 7:
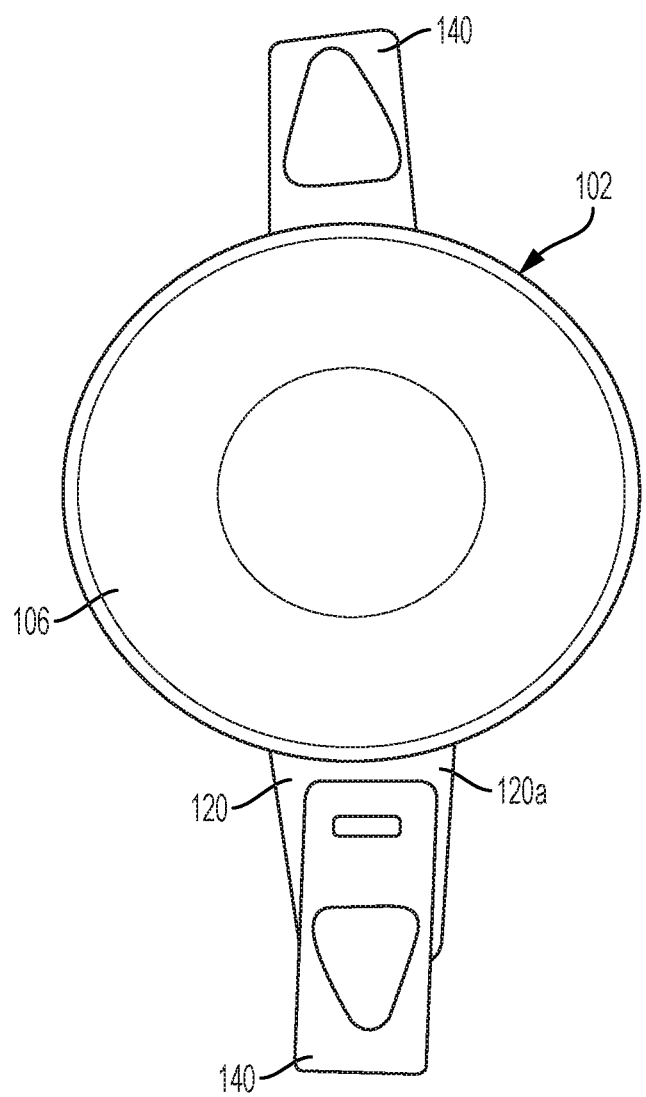
FIG. 7 is a front elevational view of the portable electronic device holder of FIG. 6.
Figure 8:
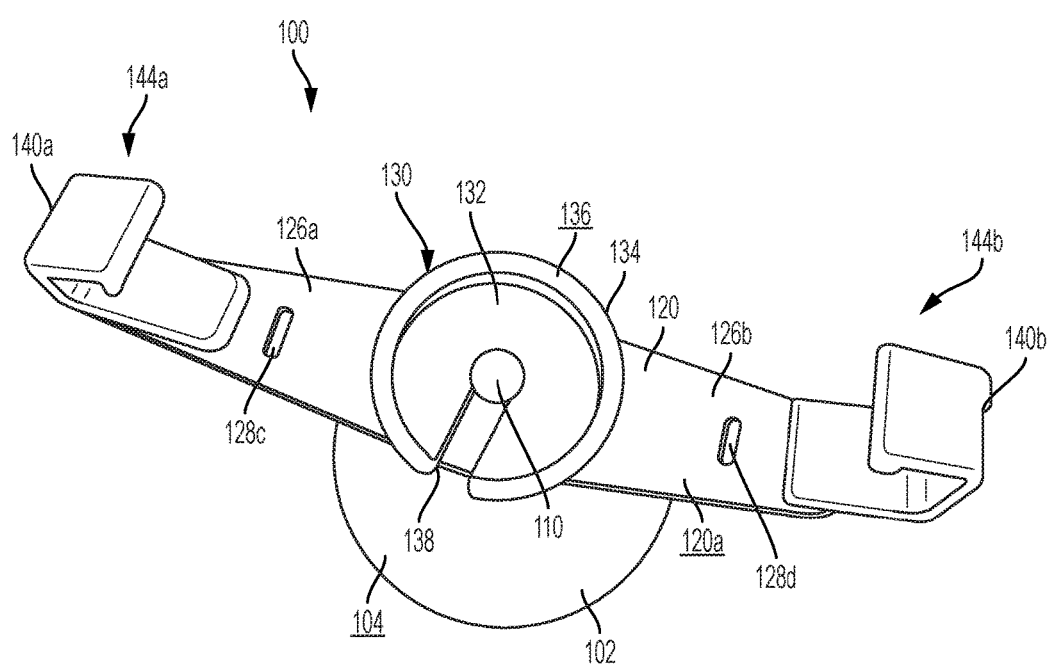
FIG. 8 is a rear elevational view of the portable electronic device holder of FIG. 6.
Figure 9:
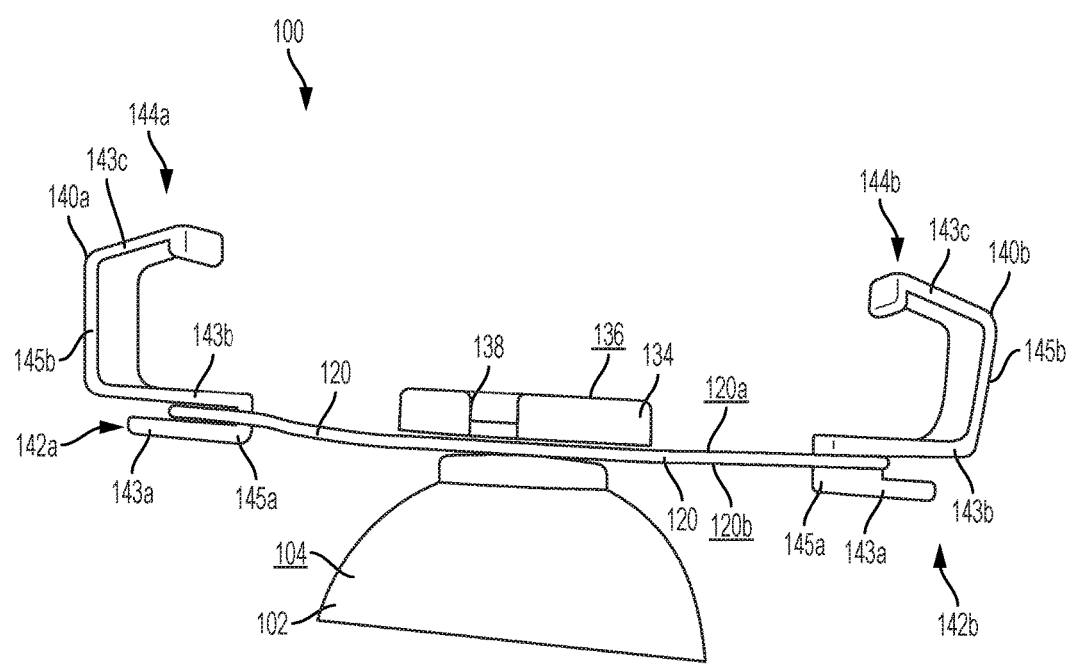
FIG. 9 is a top plan view of the portable electronic device holder of FIG. 6.
Figure 10:
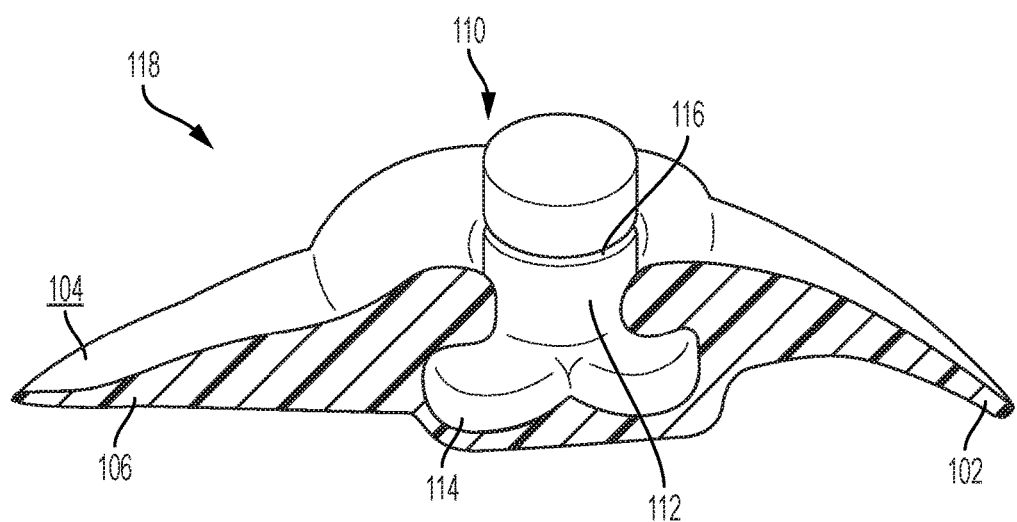
FIG. 10 is a fragmentary, cross-sectional top perspective view of a holding assembly of the portable electronic device holder of FIG. 6.
Figure 11:
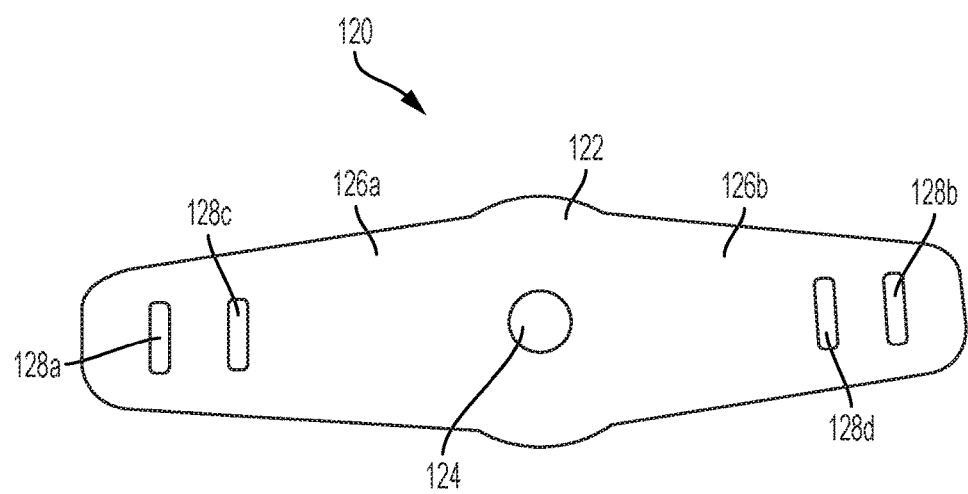
FIG. 11 is a front elevational view of a body member or base of the portable electronic device holder of FIG. 6.

FIG. 5), the engagement surface 136 is positioned against a rear device surface 11a of the portable electronic device 11 or its cover. In this preferred embodiment, the opposing hook of the pair of hooks 140 is pulled to engage the opposite side of the portable electronic device 11, thereby applying the compression force via the band or base 120. The band 120 preferably stretches when pulled to permit the user to engage the opposing hook 140 with the opposite side of the portable electronic device 11. The flexible material of the band 120 facilitates this stretching and also provides a clamping force to draw the opposing hooks 140 to the sides of the portable electronic device 11 to secure the holder 100 to the portable electronic device 11. This design and configuration of the portable electronic device holder 100 facilitates relatively simple and easy engagement and disengagement of the holder 100 from the portable electronic device 11, such as a phone, mobile phone, smartphone or tablet. The portable electronic device holder 100 is also adaptable for engagement with the portable electronic device 11 when a cover is secured to the portable electronic device 11.

Once the holder 100 is secured to the portable electronic device 11, with the rear device surface 11a against or adjacent the engagement surface 136, the holding mechanism or suction cup 102 may be urged against a surface to releasably secure the holder 100 and portable electronic device 11 to the surface. The portable electronic device 11 is secured to the surface with its operational or front face oriented away from the holder 100 such that the user can manipulate the controls of the portable electronic device and view the front face or screen. Accordingly, when the holder 100 and portable electronic device 11 are in the mounted configuration and secured to the surface, the user is not required to hold the portable electronic device 11 in one hand while manipulating the controls or operating the screen with the other hand. The user is able to have both hands free to manipulate the controls of the portable electronic device 11 or one hand to control the device 11, while the opposite hand is free to perform other tasks. The portable electronic device 11 may also be mounted to the surface with the holder 100 in the mounted configuration such that the user is able to move away from the portable electronic device 11 to take photographs or videos of groups of people, sporting events, performances, locations for security purposes or for other related reasons. The portable electronic device 11 may be selectively removed from the holder 100 for manipulation and operation by the user or may be removed from the surface with the holder 100 attached and transported or moved with the holder 100 engaged thereto.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

We claim:

1. A portable electronic device holder for holding and supporting a portable electronic device having a rear device surface, the portable electronic device holder comprising:
    a resilient base having a rear surface and a front surface, the front surface being disposed opposite the rear surface, wherein the rear surface is generally planar;
    a holding mechanism comprised of a suction cup connected to and extending from the front surface; and
    a connection mechanism extending from the resilient base, the connection mechanism having a first portion extending away from a first side of the base and a second portion extending away from a second opposite side of the base, the first and second portions extending generally parallel to the rear surface away from the base, the first and second portions including first and second hook portions on distal ends, respectively, the first and second hook portions configured to engage and secure the portable electronic device to the portable electronic device holder in a mounted configuration, the rear surface of the base positioned at least one of in facing engagement and adjacent to the rear device surface in the mounted configuration.

2. The portable electronic device holder of claim 1, further comprising:
    a cover attached to the rear device surface, the cover positioned between the rear surface and the rear device surface.

3. The portable electronic device holder of claim 1, wherein the connection mechanism is constructed of a metallic material.

4. The portable electronic device holder of claim 1, wherein the base is constructed of a polymeric material.

5. The portable electronic device holder of claim 4, wherein the polymeric material is a rubber material.

6. The portable electronic device holder of claim 1, wherein the connection mechanism is fixed to the resilient base by fasteners.

7. The portable electronic device holder of claim 1, wherein the resilient base includes a central hole, a shaft of the holding mechanism extending through the central hole in an assembled configuration.

8. The portable electronic device holder of claim 7, wherein the base includes a first slit and a second slit, the first and second slits spaced from the central hole, the first and second slits configured to attach the connection mechanism to the base.

9. The portable electronic device holder of claim 7, further comprising:
    a retainer including a groove, the shaft including a ring trench that receives a portion of the retainer proximate the groove in an assembled configuration.

10. A portable electronic device holder for holding and supporting a portable electronic device having a rear device surface, the portable electronic device holder comprising:
    a resilient base having a rear surface and a front surface, the front surface being disposed opposite the rear surface, wherein the rear surface is generally planar;
    a holding mechanism connected to and extending from the front surface, the holding mechanism includes an insert, a suction cup and a retainer, the insert and the retainer constructed of a rigid polymeric material and the suction cup constructed of an elastic polymeric material; and
    a connection mechanism extending from the resilient base, the connection mechanism having a first portion extending away from a first side of the base and a second portion extending away from a second opposite side of the base, the first and second portions extending generally parallel to the rear surface away from the base, the first and second portions including first and second hook portions on distal ends, respectively, the first and second hook portions configured to engage and secure the portable electronic device to the portable electronic device holder in a mounted configuration, the rear surface of the base positioned at least one of in facing engagement and adjacent to the rear device surface in the mounted configuration.

11. The portable electronic device holder of claim 1, wherein the connection mechanism is comprised of first and second engaging portions that are selectively mountable to the base.

12. A portable electronic device holder for holding and supporting a portable electronic device, the portable electronic device holder comprising:
- a holding assembly including a holding mechanism with a rear surface and a concave front portion, the holding assembly further including an insert attached to and extending from the rear surface of the holding mechanism, the insert including at least one foot and a shaft with a ring trench spaced from the rear surface in an assembled configuration;
- a band attached to the shaft of the insert including a central portion having a central hole and two opposing arms extending away from the central portion including a first arm and a second arm, a first slit proximate a distal end of the first arm and a second slit proximate a distal end of the second arm;
- a retainer having a circular portion and a ring wall disposed on a perimeter of the circular portion, the retainer further having a groove extending radially outward from a center of the circular portion, the groove dimensioned to engage the ring trench of the insert of the holding assembly in the assembled configuration;
- a first hook removably mounted to the first slit in the assembled configuration; and
- a second hook removably mounted to the second slit in the assembled configuration, the first and second hooks including first and second band engaging portions, respectively, and first and second electronic device engaging portion, respectively, the first and second electronic device engaging portions including first and second nubs, respectively to assist in retaining the portable electronic device in the holder.

13. The portable electronic device holder of claim 12, wherein the holding mechanism and the insert are integrally formed with each other.

14. The portable electronic device holder of claim 12, wherein the holding mechanism further includes a tab extending from the rear surface.

15. The portable electronic device holder of claim 12, wherein the holding mechanism is a suction cup constructed of an elastomeric material.

16. The portable electronic device holder of claim 15, wherein the polymeric material is silicone.

17. The portable electronic device holder of claim 12, wherein the band is constructed of a polymeric material.

18. The portable electronic device holder of claim 12, wherein the first and second hooks are constructed of a polymeric material.

19. The portable electronic device holder of claim 18, wherein the polymeric material is polyoxymethylene.

* * * * *